United States Patent
Li et al.

(10) Patent No.: US 7,634,160 B2
(45) Date of Patent: Dec. 15, 2009

(54) PASSIVE OPTICAL NETWORK SYSTEM BASED ON A WAVELENGTH PROTECTION AND PROTECTING BACKUP METHOD THEREOF

(75) Inventors: Mingsheng Li, Shenzhen (CN); Jinsong Bei, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 294 days.

(21) Appl. No.: 11/912,973

(22) PCT Filed: Apr. 29, 2005

(86) PCT No.: PCT/CN2005/000601

§ 371 (c)(1),
(2), (4) Date: Oct. 29, 2007

(87) PCT Pub. No.: WO2006/116895

PCT Pub. Date: Nov. 9, 2006

(65) Prior Publication Data

US 2008/0267628 A1    Oct. 30, 2008

(51) Int. Cl.
G02B 6/28    (2006.01)
(52) U.S. Cl. .............................. 385/24; 385/15; 398/1; 398/7
(58) Field of Classification Search ............... 385/15, 385/24; 398/1, 7
See application file for complete search history.

(56) References Cited

U.S. PATENT DOCUMENTS 5,781,320 A * 7/1998 Byers .......................... 398/56
6,362,908 B1 * 3/2002 Kimbrough et al. .......... 398/164

FOREIGN PATENT DOCUMENTS

| CN | 1474522 A | 2/2004 |
| WO | 96/32787 A1 | 10/1996 |
| WO | 98/47039 A2 | 10/1998 |

OTHER PUBLICATIONS

International Search Report for PCT/CN2005/000601.

* cited by examiner

*Primary Examiner*—Jennifer Doan
(74) *Attorney, Agent, or Firm*—Pearne & Gordon LLP

(57) ABSTRACT

The present invention discloses a passive optical network system based on wavelength protection and the protection backup method thereof. It comprises an optical line terminal (OLT) with two interface circuits, two trunk lines, an optical splitter network, multiple branch lines and optical network units (ONU), each of which is with two interface circuits. The two interface circuits of the OLT transmit downlink optical signals with different wavelengths, while the two interface circuits of the ONU transmit uplink optical signals with different wavelengths. Each trunk line is set with a wavelength division multiplexing (WDM) device and it can only pass the uplink and downlink signals of the connected interface circuits. Each branch line includes a branch optical fiber and a WDM device that is used to transmit two downlink signals to the corresponding interface circuits respectively and meanwhile transmit uplink signals from the two interface circuits as well, so as to form two active/backup bidirectional optical paths between the corresponding interface circuits of the OLT and the ONU. The cost of setting up the system in the present invention is low, but the system can provide hot backup protection for the trunk optical fiber and the OLT.

19 Claims, 6 Drawing Sheets

PASSIVE OPTICAL NETWORK SYSTEM BASED ON A WAVELENGTH PROTECTION AND PROTECTING BACKUP METHOD THEREOF

TECHNICAL FIELD

The present invention pertains to a network protection system, especially to a network protection system of a passive optical network (PON) system and a protection backup method thereof.

TECHNOLOGY BACKGROUND

As shown in FIG. 1, a PON communication system comprises the following parts: an optical line terminal (OLT) C01, a trunk optical fiber C02, an optical splitter network C03, an optical network unit (ONU) C04 and a branch optical fiber C05. The trunk optical fiber C02, the optical splitter network C03 and the branch optical fiber C05 are collectively referred to an optical distribution network (ODN) which is a passive system, therefore, any network with this kind of architecture is named as passive optical network (PON).

PON communication system supports multi-service transmission and needs to provide reliability at a telecommunication level, and protection switching is its important content. ITU G.984 series and G.983 series define four protection methods of a PON system. The system structure shown in FIG. 2 only targets for optical fiber backup and only supports cold backup; the system structure shown in FIG. 3 only targets for OLT backup and only supports cold backup; what is shown in FIG. 5 is the system structure for half-backup, providing end-to-end protection in cold backup, as well as the trunk optical fiber and the OPT interface circuit protection in cold backup. The protection types offered in the above three system structures are all cold backups and need new distance measurement and registration after the active and backup systems perform protection switching, and its protection switching speed can not meet the telecommunication level requirement of 50 ms.

FIG. 4 shows a system structure of full backup, providing end-to-end protection of the ONU, the interface circuits of OLT and the optical fiber links (including trunk fiber and branch fiber) between them. This type of protection is hot backup and does not need new distance measurement and registration after protection switching, therefore it is able to offer 50 ms protection switching at telecommunication level. The standard G.983 specifically describes and regulates the protection mechanism in FIG. 4.

Everything in the full backup system in FIG. 4 is doubled: two OLT interface circuits, two trunk fibers, two optical splitters, two branch fibers, and the ONU with two interface circuits, therefore the cost is high and it is only suitable for the optical fiber-to-resident corporation users or enterprise users with high demand for reliability, and it is not suitable for public users who are more sensitive with price. In this system, if only one branch optical fiber is set between the optical splitter and the ONU, such as the connection to ONU 1 in the figure, then there will be no protection for the users of this unit.

When the PON is applied in the optical fiber-to-the-home (FTTH) project for public user, the damage of one branch fiber only impacts the single user that is connected with that branch fiber while no one else will be affected, however, when the trunk fiber or OLT is damaged, the entire PON will be paralyzed. Therefore, considering feasibility, reliability and performance, when PON is used for broad public users, it needs to provide the protection time of 50 ms, but branch optical fiber belongs to single users and no protection is needed. Because the optical splitter in the public parts is passive and is placed in the boxes and small rooms with guard, the reliability is high and no backup is needed, in other words, the protection part is only designed for trunk fiber and OLT in public parts. There are only two protection types offered in FIG. 4, either full-link end-to-end protection, or no protection at all, which can not meet the protection demand of public users.

SUMMARY OF THE INVENTION

The technical problem that needs to be solved in present invention is to provide a passive optical network system based on wavelength protection. The cost is relative low and moreover, it can provide hot backup protection for the trunk fiber and OLT.

In order to solve the above technology problem, the present invention provides a passive optical network system based on wavelength protection, which comprises an OLT that includes a first interface circuit A and a second interface circuit B, a first trunk fiber and a second trunk fiber, an optical splitter network that is connected with the first and the second trunk fibers, branch fibers that are connected with the optical splitter network, and multiple ONUs P that include the first interface circuits A' and the second interface circuits B', wherein it further comprises:

a first WDM (wave division multiplexing) device, in which one end is connected with the first trunk fiber while the other end is connected with the first interface circuit A through a first interface optical fiber;

a second WDM device, in which one end is connected with the second trunk fiber while the other end is connected with the second interface circuit B through a second interface optical fiber; and multiple WDM devices at unit side, in which one end in each device is connected with one branch fiber and the other one is connected with the first interface circuit A' and the second interface circuit B' of one ONU P respectively through two unit interface optical fibers;

Said first interface circuit A is used to transmit downlink optical signal $D_A$, the second interface circuit B is used to transmit downlink optical signal $D_B$, the wavelengths of $D_A$ and $D_B$ being different; said first interface circuit A' is used to transmit uplink optical signal $U_A$, the second interface circuit B' is used to transmit uplink optical signal $U_B$, the wavelengths of $U_A$ and $U_B$ being different;

Said first WDM device can pass through the downlink optical signal $D_A$ and the uplink optical signal $U_A$, but refuses the uplink optical signal $U_B$; said second WDM device can pass the downlink optical signal $D_B$ and the uplink optical signal $U_B$, but refuses the uplink optical signal $U_A$;

Said optical splitter network is used to distribute the optical power of the downlink optical signals sent in by the two trunk fiber ports to each branch fiber port; the optical signals sent in by each branch fiber port are superimposed first and then output through trunk fiber ports;

Said WDM device at unit side can respectively pass the downlink optical signals $D_A$ and $D_B$ that are transmitted by the branch fibers connected with it to the first interface circuit A' and the second interface circuit B' of the corresponding ONU P, and will pass the uplink optical signals that are transmitted by these two interface circuits to said branch fiber.

Additionally, the PON system also possesses the following characteristics: it further comprises several ONUs P' that include the first interface circuits A' and the second interface circuits B', the first interface circuit A' and the second interface circuit B' of this ONU are successively connected to said optical splitter network through a unit interface optical fiber, a WDM device at unit side and a branch fiber respectively, wherein the WDM device at unit side that is connected with the first interface circuit A' can pass the downlink optical signal $D_A$ and the uplink optical signal $U_A$, but refuses the downlink optical signal $D_B$; the WDM device at unit side that is connected with the second interface circuit B' can pass the downlink optical signal $D_B$ and the uplink optical signal $U_B$, but refuses the downlink optical signal $D_A$.

Additionally, said PON system also possesses the following characteristics: it comprises several ONUs P''' that include the first interface circuits A', the first interface circuit A' of this ONU P''' is successively connected to said optical splitter network through a unit interface optical fiber, a WDM device at unit side and a branch fiber. The WDM device at unit side can pass the downlink optical signal $D_A$ and the uplink optical signal $U_A$, but refuses the downlink optical signal $D_B$.

Additionally, said PON system also possesses the following characteristic: said optical splitter network is composed of an optical splitter of N:2.

Additionally, said PON system also possesses the following characteristics: said optical splitter network is composed of two optical splitters of 2:1 and two splitters of N:2, wherein the two outputs of each optical splitter of 2:1 are connected to the input ends of said two optical splitters of N:2.

Additionally, said PON system also possesses the following characteristic: the topology of the PON system is tree topology, bus topology, ring topology or a combination thereof.

Additionally, said PON system also possesses the following characteristics: the system is a PON system of WDM, in which the wavelengths of the uplink signals $U_A$ transmitted by the first interface circuit A' in each ONU are different from each other, so are the wavelengths of the uplink signals $U_B$ transmitted by the second interface circuit B'. However the band in which uplink optical signal $U_A$ resides does not overlap the band in which uplink optical signal $U_B$ resides. The first WDM device can only pass the signals of the band in which uplink optical signal $U_A$ resides in uplink direction; the second WDM device can only pass through the signals of the band in which uplink optical signal $U_B$ resides in uplink direction.

Another technical problem that needs to be solved in present invention is to provide a protection backup method of PON system based on wavelength protection. The cost needed for realizing the protection in this method is relative low, and the method can provide a hot backup protection for the trunk fiber and the OLT.

In order to solve the above technical problem, the present invention provides a protection backup method of PON system based on wavelength protection, which comprises the following steps:

When operating properly, in the downlink direction, the interface circuits A and B of the OLT respectively transmit downlink optical signals $D_A$ and $D_B$ with different wavelengths. These two optical signals will proceed for optical power distribution after being transmitted to the optical splitter network through individual trunk line, so that there are downlink optical signals $D_A$ and $D_B$ within each branch fiber. Then by utilizing the WDM device on the branch line, the optical signal $U_A$ in the branch fiber is only passed to the interface circuit A of the ONU and the optical signal $U_B$ is only passed to the interface circuit B of the ONU;

In the uplink direction, the interface circuits A and B of the OLT will respectively transmit uplink optical signals $U_A$ and $U_B$ with different wavelengths; these two optical signals will first be transmitted to optical splitter network through the branch lines and then be transmitted to the two trunk lines. Then by utilizing the WDM device in the trunk line, the optical signal $U_A$ is only passed to the interface circuit A of the OLT and the optical signal $U_B$ is only passed to the interface circuit B of the OLT;

As a result, active/backup bidirectional optical paths are formed between the interface circuits A of said OLT and ONU and between the interface circuits B of said OLT and the ONU. The active/backup bidirectional optical paths independently perform registration, distance measurement and dynamic adjustments of the bandwidth, therefore when the active bidirectional optical path is out of work, the service will directly be switched to the backup bidirectional optical path.

Additionally, said protection backup method also possesses the following characteristic: said active/backup bidirectional optical paths are configured with load sharing mode and the service is transmitted at the same time in the both active/backup optical paths.

Additionally, said protection backup method also possesses the following characteristic: when the system is a PON system of WDM, the WDM device of the trunk line is set in such a way that it can pass the signals of one band in the uplink direction.

In conclusion, compared with other PON protection systems, the PON system based on wavelength protection has the following characteristics and advantages:

(1) The intermediate reliability protection only protects the trunk fiber and the OLT and can meet the demand of telecommunication level of 50 ms. Furthermore, each ONU only needs to be distributed with one branch optical fiber, which significantly reduces the quantity and cabling cost of branch fibers, therefore resulting in a lower cost. As for the common family users, the reliability is good enough, and therefore it is an economical protection type.

(2) it is capable of realizing multiple protection types, including high reliability protection and intermediate reliability protection, both of which can both meet the telecommunication level demand of 50 ms, and meanwhile protection switching will not lead to the interruption of user service. Wherein, the high reliability protection can provide end-to-end full link protection, and it is for sure that the PON system based on wavelength protection also supports non-protection type.

(3) The PON system based on wavelength protection also supports various types of optical splitter networks.

(4) The PON system based on wavelength protection also supports topologies such as tree, bus, ring and the like, and meanwhile it also supports various PON technologies such as APON, EPON, GPON and WDM PON, etc.

(5) The system can be set in load sharing mode. The active/backup optical paths will transmit service at the same time, resulting in an increase in the system bandwidth.

In the diagrams, WDM represents wavelength division multiplexing device, PONLT (1) represents interface circuit 1, PONLT (0) represents interface circuit 0.

PREFERRED EMBODIMENTS OF THE PRESENT INVENTION

Figure 1:
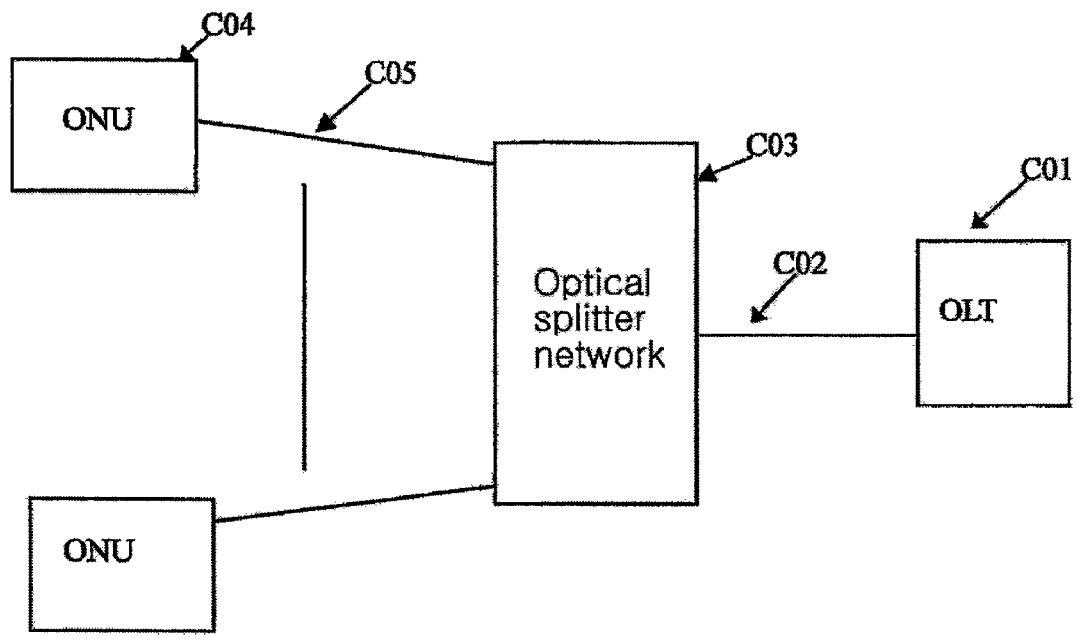
FIG. 1 is a schematic diagram of PON system.
Figure 2:
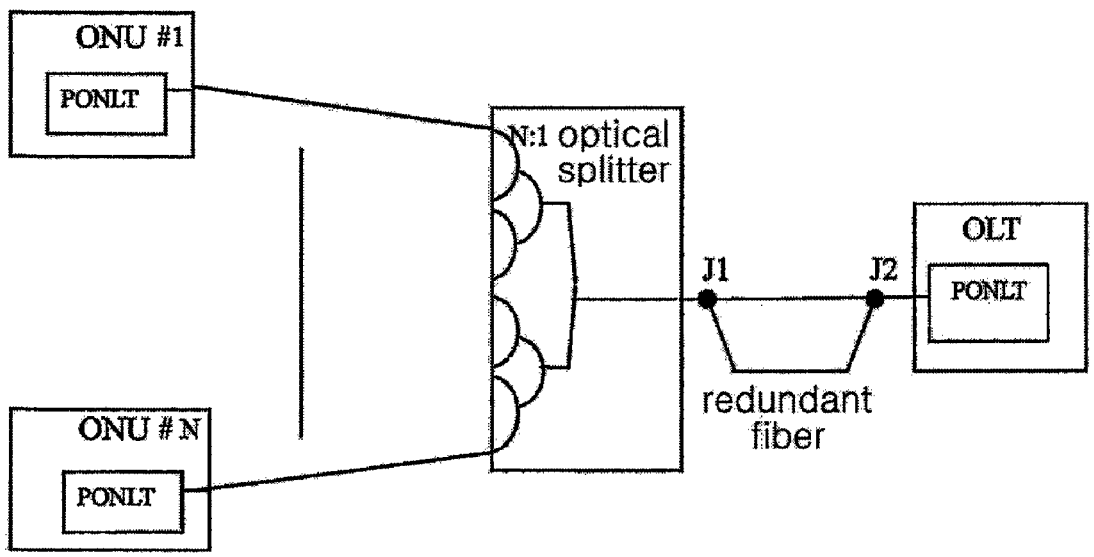
FIG. 2 is a structural diagram of the optical fiber backup system, which only supports cold backup.
Figure 3:
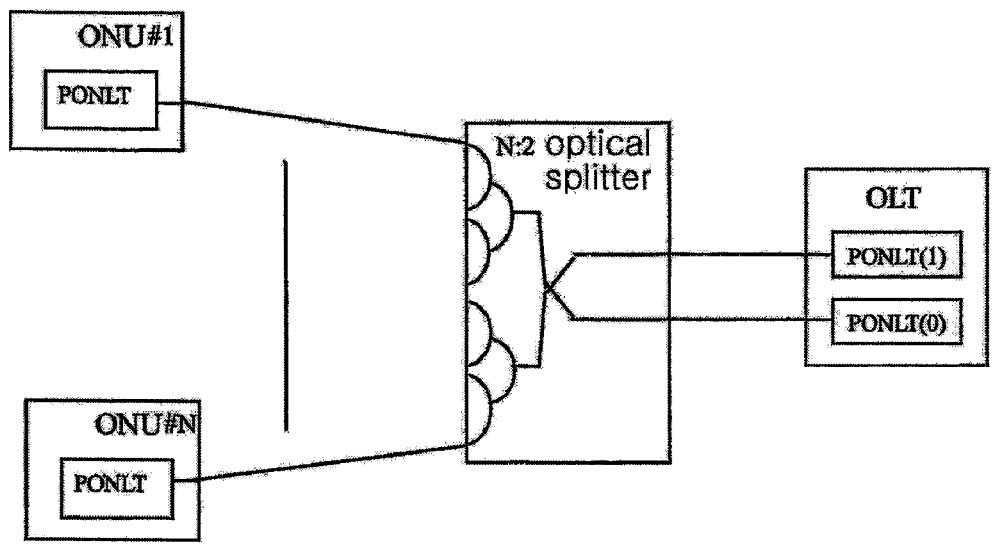
FIG. 3 is a structural diagram of OLT backup system only, which only supports cold backup.
Figure 4:
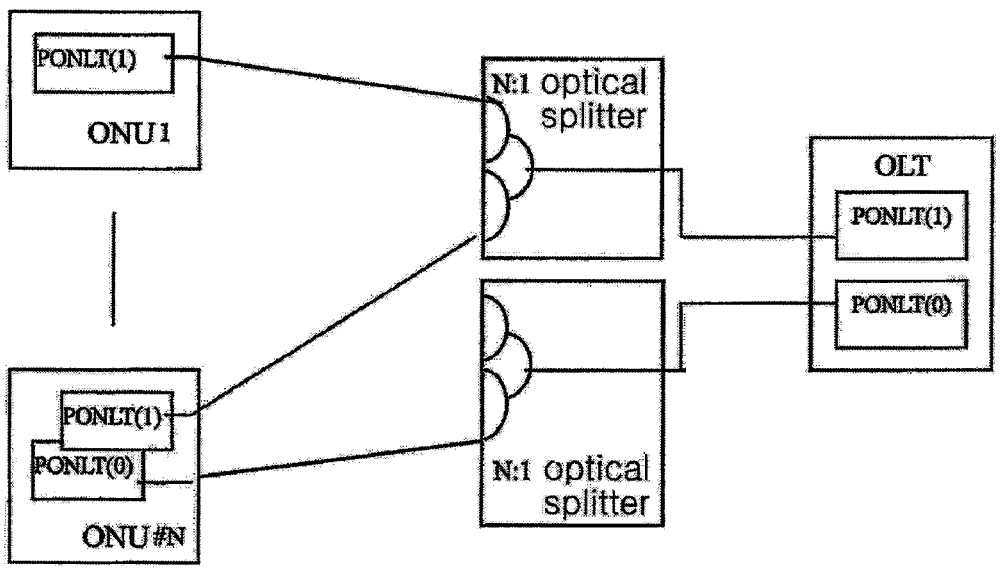
FIG. 4 is a structural diagram of the full backup system, which provides end-to-end protection and supports hot backup.
Figure 5:
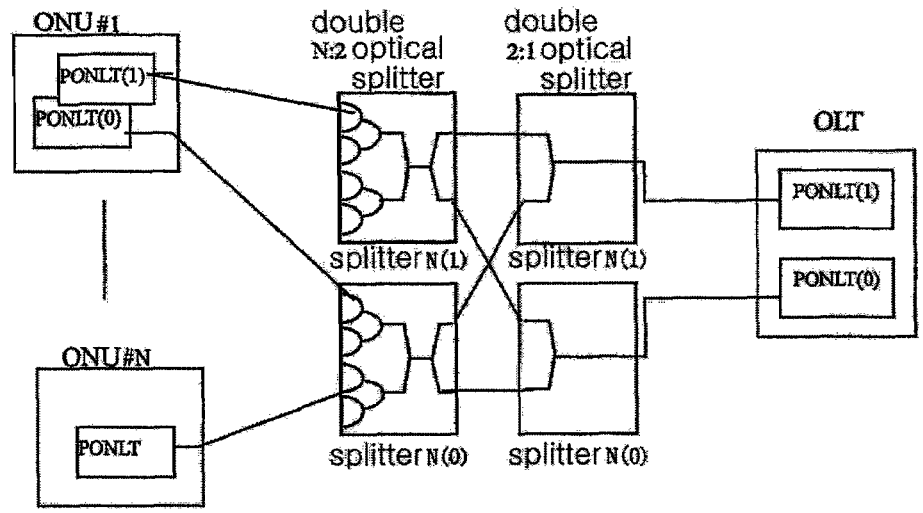
FIG. 5 is a structural diagram of the half backup system, which provides end-to-end protection of cold backup and the trunk fiber as well as OLT interface circuit protection of cold backup.
Figure 6:
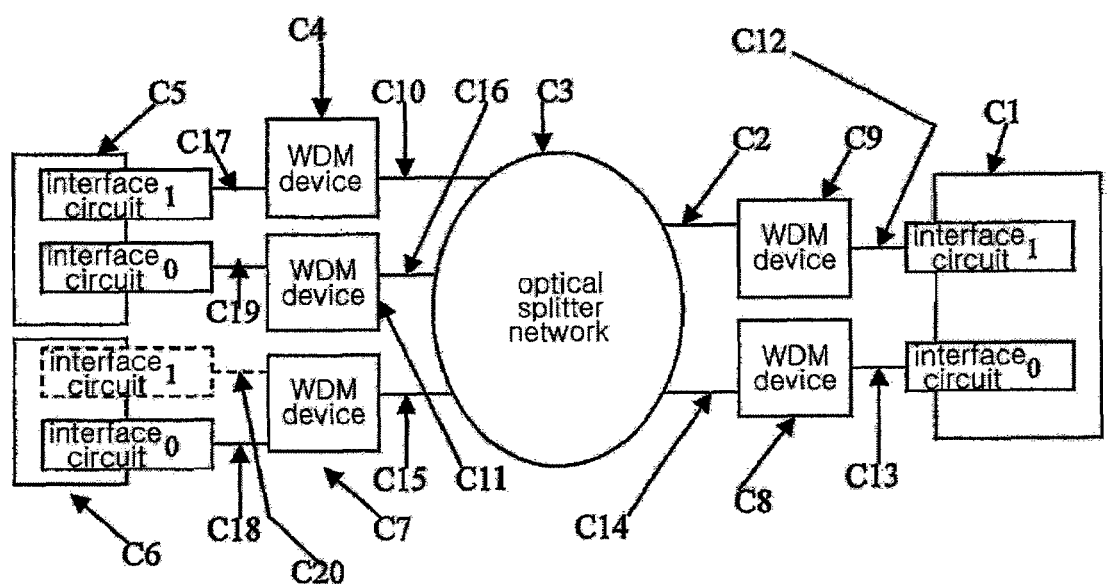
FIG. 6 is a structural diagram of PON protection switching based on wavelength in one embodiment of the present invention.

FIG. 6 shows the system structure in one embodiment of the present invention. In order to support wavelength-based protection, the OLT C1 must comprises two of active/backup interface circuits, which in FIG. 6 are interface circuit 1 and interface circuit 0. The two interface circuits of OLT C1 are respectively connected to the WDM devices C9 and C8 at the terminal side through terminal interface optical fibers C12 and C13. On the other hand, WDM devices C9 and C8 are respectively connected to the optical splitter network C3 through trunk fibers C2 and C14. The optical splitter network C3 can connect with multiple branch fibers at the same time; wherein the branch fibers C10, C16, and C15 are respectively connected with WDM devices at unit side C4, C11 and C7. The connection between the WDM device at unit side and the interface circuit of ONU is realized through the unit interface optical fiber; wherein, the two ends of unit interface optical fiber C17 are respectively connected to WDM device C4 and the interface circuit 1 of ONU C5, the two ends of unit interface optical fiber C19 are respectively connected to WDM device C11 and the interface circuit 0 of ONU C5; while the two ends of unit interface optical fiber C20 are respectively connected to WDM device C7 and the interface circuit 1 of ONU C6, the two ends of unit interface optical fiber C18 are respectively connected to WDM device C7 and the interface circuit 0 of ONU C6. In the text, the part including WDM device between optical splitter network and ONU is named as branch line, and the part including WDM device between optical splitter network and OLT is named as trunk line.

In the system, the interface circuit 1 and interface circuit 0 of OLT C1 respectively send downlink optical signals with wavelengths of $\lambda 1$ and $\lambda 3$, while the interface circuit 1 and interface circuit 0 of each ONU respectively send uplink optical signals with wavelengths of $\lambda 2$ and $\lambda 4$, wherein $\lambda 1 \neq \lambda 3, \lambda 2 \neq \lambda 4$.

The WDM devices C9 and C4 support the optical signals with wavelengths of $\lambda 1$ and $\lambda 2$ to pass through, but refuse the signals with wavelengths of $\lambda 3$ and $\lambda 4$; the WDM devices C8 and C11 support the optical signals with wavelengths of $\lambda 3$ and $\lambda 4$ to pass through, but refuse the signals with wavelengths of $\lambda 1$ and $\lambda 2$. While in the downlink direction (from line end to network unit), the WDM device C7 passes the optical signal with wavelength of $\lambda 1$ to the port that is connected with the unit interface optical fiber C20 and passes the optical signal with wavelength of $\lambda 3$ to the port that is connected with the unit interface optical fiber C18; in the uplink direction, the device can pass the optical signals with wavelengths of $\lambda 2$ and $\lambda 4$ that are transmitted to said two ports to the branch fiber C15, and can realize the isolation between the two ports.

Figure 7:
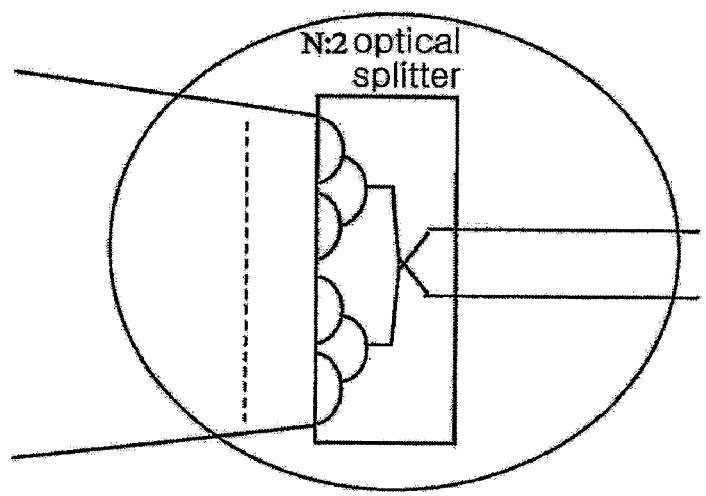
FIG. 7 is a schematic diagram of the optical splitter network constructed by a single optical splitter of N:2.

The optical splitter network C3 is a multiple-port optical power distribution network that is constructed by one or more optical splitters. In the present embodiment, it comprises two trunk fiber ports and multiple branch fiber ports, for the optical signals that are sent in from the trunk fiber port, the optical power is distributed to each branch fiber port with a certain ratio (the ratio of the optical signal power that is sent out by each branch fiber can be arbitrary). The optical signals that are sent in from each branch fiber port in reverse direction are super-positioned and then are sent out from the trunk fiber port at a certain ratio (usually equally distributing the optical power at a ration of 1:1). The optical splitter network has nothing to do with the wavelength and in the present embodiment, said optical splitter network is implemented by employing an optical splitter of N:2, as shown in FIG. 7. However the invention is not limited to that.

The first bidirectional optical path:

The interface circuit 1 of OLT C1 sends the optical signal with wavelength of $\lambda 1$ to the terminal interface optical fiber C12. The optical signal with this wavelength is then sent to the WDM device C9 through interface optical fiber C12. Since C9 supports the optical signal with wavelength of $\lambda 1$ to pass through, the optical signal with wavelength of $\lambda 1$ can then be transmitted to trunk fiber C2 through device C9, and C2 transmits the $\lambda 1$ optical signal to the optical splitter network C3, C3 distributes the $\lambda 1$ optical signal at a certain power ratio to all the branch fibers, including C10, C16 and C15. These branch fibers C10, C16 and C15 respectively transmit the $\lambda 1$ optical signal to the WDM devices C4, C1 and C7 connected with each branch fiber. The WDM device C4 passes the $\lambda 1$ optical signal to the interface optical fiber C17 and furthermore sends the signal to the interface circuit 1 of ONU C5. While the WDM device C1 filters out the $\lambda 1$ optical signal without passing the signal to the interface circuit 0 of ONU C5 through the interface optical fiber C19, the WDM device C7 passes the $\lambda 1$ optical signal to the interface optical fiber C20 and furthermore sends the signal to the interface circuit 1 of ONU C6, while the WDM device C7 does not pass the $\lambda 1$ optical signal to the interface optical fiber C18, therefore the $\lambda 1$ optical signal can not be transmitted to the interface circuit 0 of ONU C6. As a result, a communication path with wavelength of $\lambda 1$ is set up between the interface circuit 1 of OLT C1 and the interface circuits 1 of ONU C5 and ONU C6, which is called downlink $\lambda 1$ optical path.

The operation transmission wavelengths of interface circuits 1 in ONU C5 and C6 are both of $\lambda 2$; these two interface circuits can not send optical signals at the same time, but transmit in turn by employing TDMA mechanism. The $\lambda 2$ optical signals sent by interface circuits 1 in both C5 and C6 are transmitted to WDM devices C4 and C7 through unit interface optical fibers C20 and C17. Because there is a great isolation between interfaces of C20 and C 18 of WDM device C7, the $\lambda 2$ optical signal will not be sent to the interface optical fiber C18, while the WDM device C7 can pass the $\lambda 2$ optical signal to the branch fiber C15, and further to the optical splitter network C3. The WDM device C4 can pass the $\lambda 2$ optical signal to the branch fiber C10, and further to the optical splitter network. The optical splitter network will not transmit the λ2 optical signal to the branch fiber C16, but can pass it to the trunk fiber C2 and C14 at the same time, and further respectively to the WDM devices C9 and C8. Due to the filtering function of C8 for λ2 optical signal, the λ2 optical signal can not be transmitted to the interface circuit 0 of the OLT C1, while C9 has a passing function for λ2 optical signal, therefore, the λ2 signal is transmitted to the terminal interface optical fiber C12 and further to the interface circuit 1 of OLT C1. As a result, an optical communication path with wavelength of λ2 is set up between the interface circuit 1 of OLT C1 and the interface circuits 1 of ONUs C5 and C6, which is called uplink λ2 optical path.

In this way, a bidirectional communication optical path is formed between the interface circuits 1 of OLT and ONU, wherein, the uplink wavelength of the optical path is of λ2, and the downlink wavelength is of λ1.

The second bidirectional optical path:

The interface circuit 0 of OLT C1 sends the optical signal with wavelength to λ3 to the terminal interface optical fiber C13. The optical signal with this wavelength was then sent to the WDM device C8 through interface optical fiber C13. Since C8 supports the optical signal with wavelength of λ3 to pass through, the optical signal with wavelength of λ3 can then be transmitted to trunk fiber C14 by device C8. C14 transmits the λ3 optical signal to the optical splitter network C3, C3 distributes the signal at a certain power ratio to all the branch fibers, including C10, C16 and C15. These branch fibers C10, C16 and C15 respectively transmit the λ3 optical signal to the WDM devices C4, C11 and C7 connected with them individually. The WDM device C4 filters out the λ3 optical signal, and the signal is not sent to the interface optical fiber C17, therefore, the λ3 optical signal will not be transmitted to the interface circuit 1 of the ONU C5. The WDM device C11 passes the λ3 optical signal to the interface optical fiber C19 and further to the interface circuit 0 of ONU C5. While, the WDM device C7 does not pass the λ3 optical signal to the interface optical fiber C20, therefore the λ1 optical signal can not be transmitted to the interface circuit 1 of ONU C6. On the other hand, the WDM device C7 can pass the λ3 optical signal to the interface optical fiber C18, and further to the interface circuit 0 of ONU C6. As a result, a communication path with wavelength of λ3 is set up between the interface circuit 0 of OLT C1 and the interface circuits 0 of ONU C5 and ONU C6, which is called downlink λ3 optical path.

The operation transmission wavelengths of interface circuits 0 in ONU C5 and C6 are both of λ4; these two interface circuits can not send optical signals at the same time, but transmit in turn by employing TDMA mechanism. The λ4 optical signals sent out by interface circuits 0 in both C5 and C6 are transmitted to WDM devices C11 and C7 through unit interface optical fibers C18 and C19. Because there is a great isolation between interfaces of C20 and C18 of WDM device C7, the λ4 optical signal will not be sent to the interface optical fiber C20, while the WDM device C7 can pass the λ4 optical signal to the branch fiber C15, and further to the optical splitter network C3. The WDM device C11 can pass the λ4 optical signal to the branch fiber C16, and further to the optical splitter network C3. The optical splitter network will not transmit the λ4 optical signal to the branch fiber C10, but can pass it to the trunk fibers C2 and C14 at the same time, and further to the WDM devices C9 and C8 respectively. Due to the filtering function of C9 for λ4 optical signal, the λ4 optical signal can not be transmitted to the interface circuit 1 of the OLT C1; one the other hand, C8 has a passing function for λ4 optical signal, therefore, the λ4 optical signal is transmitted to the terminal interface optical fiber C13 and further to the interface circuit 0 of OLT C1. As a result, an optical communication path with wavelength of λ4 is set up between the interface circuit 0 of OLT C1 and the interface circuits 0 of ONUs C5 and C6, which is called uplink λ4 optical path.

Thus, a bidirectional communication optical path is formed between the interface circuits 0 of OLT and ONU, wherein, the uplink wavelength of the optical path is of λ4, and the downlink wavelength is of λ3.

From above analysis, it can be seen that by using WDM technology, two independent bidirectional communication optical paths can be formed between the OLT and ONU, wherein the interface 1 uses the first bidirectional optical path with wavelengths of λ1 and λ2, while the interface 0 uses the second bidirectional optical path with wavelengths of λ3 and λ4. The two bidirectional optical paths can work at the same time and form the active/backup communication paths of hot backup for each other. If the configuration service is transmitted through the first bidirectional optical path, the first path is the active communication path and the second bidirectional optical path can be set as the backup communication path for the first path. When there is a malfunction with the first bidirectional optical communication path, the service can be switched to the second bidirectional optical communication path, which will continue transmission, and thus the service can be protected, and will not be disconnected and fail in transmission due to the malfunction of the first bidirectional optical path. Since the hot backup method is employed, the two active/backup bidirectional optical paths can independently perform registration, distance measurement and bandwidth dynamic adjustment, therefore when the active bidirectional optical path malfunctions, the service will be switched to the backup bidirectional optical path, and after the protection switching, the ONU of the PON doesn't need to register over again and the OLT doesn't need to perform distance measurement for ONU, thus ensuring the time for protection switching, which can be limited to within 50 ms required by telecommunication level.

Besides, the system can also be configured in load sharing mode, in which the service is transmitted through active and backup paths at the same time, resulting in the increase of system bandwidth.

In the embodiment of FIG. 6, there actually exist two kinds of branch structures (referring to the connection structure from the optical splitter network to each ONU) between ONU and optical splitter network. It is a hybrid structure and provides many optional protection mechanisms, wherein:

There are two branch fibers C10 and C16 between ONU C5 and optical splitter network C3, therefore the ONU C5 can provide end-to-end hot backup protection of service, and no matter whether there is something wrong with the trunk fiber, branch fiber or the interface circuit of OLT and ONU, the service can always be protected with high reliability. However, since the interface circuit of the OLT and ONU, the trunk fiber, the branch fiber and the interface fiber all need to be doubled, the cost is high.

There is only one branch fiber C15 between ONU C6 and the optical splitter network C3, and in the meantime, C6 is configured with unit interface optical fiber C20, C18 and interface circuit 1 and 0. By transmitting two optical path signals in one branch fiber at the same time, the ONU C6 can provide fault protection of interface circuits of OLT and trunk fiber for the services it carries, and also supports hot backup. The intermediate reliability provided by this protection can satisfy the requirement of public users. Since it saves the cost of one branch fiber and its cabling project, the total cost is significantly reduced, it perfectly fits the occasion for public user telecommunications network.

In another embodiment of the present invention, the part between ONU and optical splitter network in PON system only employs the branch structure that is used between the ONU C6 and optical splitter network C3 in FIG. 6, thereby, providing intermediate reliable protection for each ONU.

Figure 8:
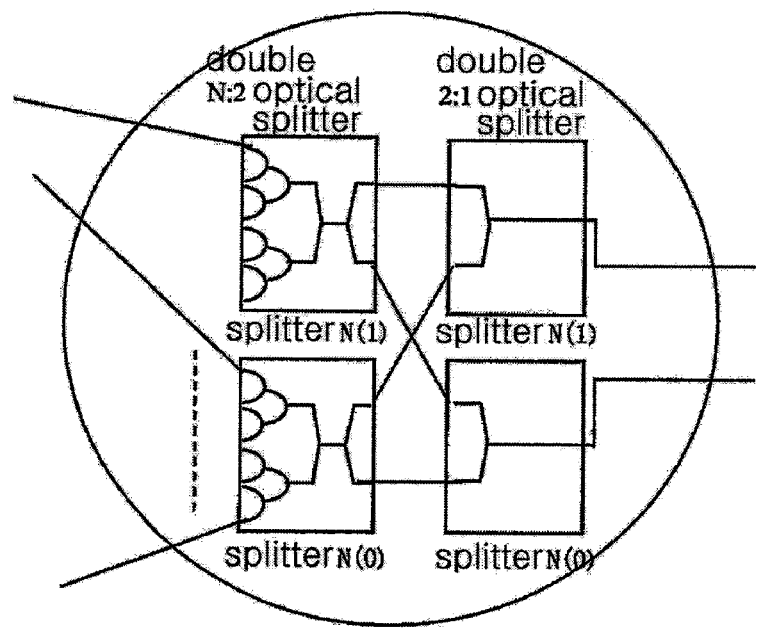
FIG. 8 is a schematic diagram of net optical splitter network that is constructed by double optical splitters of 2:1 and double optical splitters of N:2.

In another embodiment of the present invention, the optical splitter network in FIG. 6 employs the net-like optical splitter network that is constructed by two optical splitters of 2:1 and two optical splitters of N:2 shown in FIG. 8. The two outputs of each optical splitter of 2:1 are both connected with the inputs of the two optical splitters of 2:1 and all the optical splitters are in working state. By utilizing said splitter network, it can provide hot backup protection when a certain splitter is out of work, thereby increasing the reliability of the protection.

Figure 9:
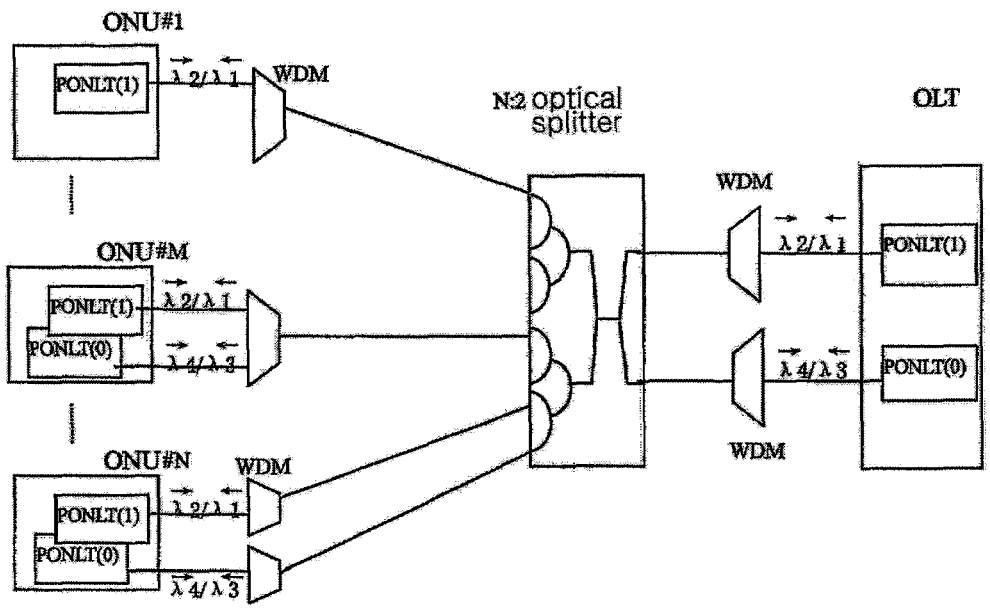
FIG. 9 is a power distribution PON system based on wavelength protection in one embodiment of the present invention.

In another embodiment of present invention, if the situation is sensible to cost but has no demand on reliability, when the interface circuit 1 and interface fiber C20 of ONU C6 are not configured, the ONU C6 then becomes an ONU without protection, which can be referenced to the ONU #1 in FIG. 9. The branch structure with no protection, the branch structure providing intermediate reliability and the branch structure providing high reliability in the invention can be combined arbitrarily.

The PON system based on wavelength protection in FIG. 9 supports power distribution PON, which is substantially the same as the system in FIG. 6, wherein $\lambda 1$ and $\lambda 3$ are downlink active and backup wavelengths, and $\lambda 2$ and $\lambda 4$ are uplink active and backup wavelengths.

Figure 11:
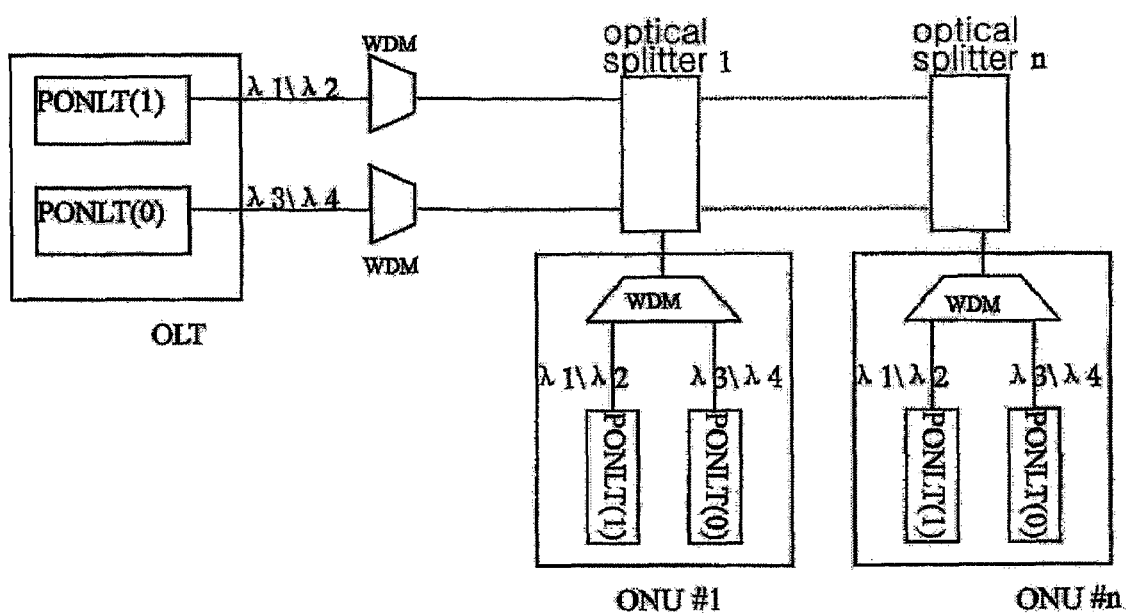
FIG. 11 is a PON system based on wavelength protection in another embodiment of the present invention, which employs bus topology network.

Another embodiment in the present invention is a PON that supports WDM. In FIG. 11, a WDM PON system based on wavelength protection is shown, wherein, in the downlink direction, there is an active wavelength and a backup wavelength in which $\lambda dw$ is the downlink active wavelength and $\lambda dp$ is the downlink backup wavelength; however, in the uplink direction, each ONU employs an active wavelength and a backup wavelength, wherein $\lambda w1$: n (expressing awl, $\lambda w2 \ldots \lambda wn$) is the uplink active wavelength and $\lambda p1$: n (expressing $\lambda p1, \lambda p2 \ldots \lambda pn$) is the uplink backup wavelength.

In the WDM PON system, the wavelengths of uplink optical signals sent by each ONU are different, and after the interface circuits of OLTs receive these signals with different wavelengths, they will distinguish them with WDM device and then process them individually. Based on the current WDM PON system, the present invention only needs to add several WDM devices to realize wavelength-based protection, and the location of the WDM devices is the same as in the FIG. 6 and will not be described further. However, what is different from FIG. 6 embodiment is that the two WDM devices that are connected with the trunk fibers in the uplink direction must pass one waveband, in other words, one must pass wavelength of $\lambda w1:n$, and the other must pass wavelength of $\lambda p1:n$.

Figure 10:
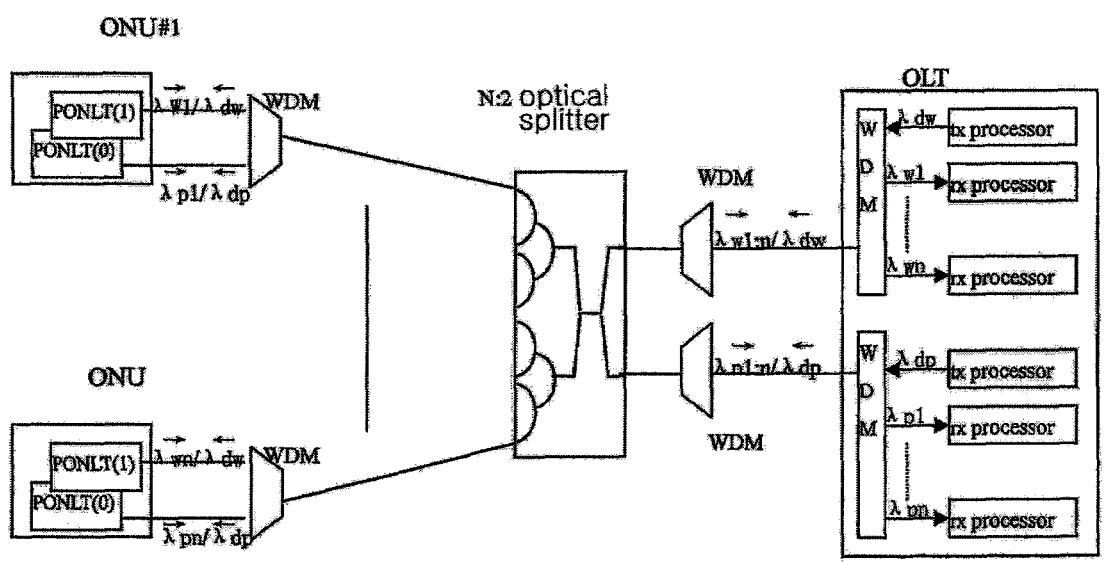
FIG. 10 is a WDM PON system based on wavelength protection in another embodiment of the present invention.

Besides, the PON system based on wavelength protection has nothing to do with topology structure and it can support various topology structures. The FIGS. 9 and 10 both belong to tree-structure PON system based on wavelength protection. In another embodiment in the present invention, a PON system with bus topology structure based on wavelength protection is used, as shown in FIG. 11, and the multiple optical splitters on the trunk fiber are inter-connected through buses. However, the basic principles are the same, as long as the optical splitter network constructed by these optical splitters can distribute the optical signals sent in from trunk fiber port to each branch fiber port at a certain optical power ratio, and the optical signals sent in reversely from each branch fiber port are super-positioned first and are then output from the trunk fiber port at a certain ratio. In another embodiment of the present invention, the PON system based on wavelength protection can also employ ring topology.

INDUSTRIAL APPLICABILITY

The present invention can be applied in various PON protection systems and provide hot backup protection for trunk fiber and OLT, therefore it can meet the demand of 50 ms at telecommunication level and significantly reduce the quantity of branch fibers and its cabling cost, and is particularly suitable for the protection of common family users.

We claim:

1. A passive optical network system based on wavelength protection, comprising an OLT that includes a first interface circuit A and a second interface circuit B, a first trunk fiber and a second trunk fiber, an optical splitter network that is connected with the first trunk fiber and the second trunk fiber, branch fibers that are connected with the optical splitter network, and multiple ONUs P that include first interface circuits A' and second interface circuits B', characterized in that it also comprises:

a first WDM device, one end of which being connected with the first trunk fiber, and other end being connected with the first interface circuit A through a first interface optical fiber;

a second WDM device, one end of which being connected with the second trunk optical fiber, and the other end being connected with the second interface circuit B through a second interface optical fiber; and multiple WDM devices at unit side, one end of each being connected with one branch fiber, and the other end being respectively connected with the first interface circuit A' and the second interface circuit B' of one ONU P through two unit interface optical fibers;

said first interface circuit A is used to transmit a downlink optical signal $D_A$; the second interface circuit B' is used to transmit a downlink optical signal $D_B$, wherein wavelengths of $D_A$ and $D_B$ are different; said first interface circuit A' is used to transmit an uplink optical signal $U_A$; the second interface circuit B' is used to transmit an uplink optical signal $U_B$, wherein wavelengths of $U_A$ and $U_B$ are different;

said first WDM device can pass the downlink optical signal $D_A$ and the uplink optical signal $U_A$, but refuses the uplink optical signal $U_B$, while said second WDM device can pass the downlink optical signal $D_B$ and the uplink optical signal $U_B$, but refuses the uplink optical signal $U_A$;

said optical splitter network is used to distribute optical power of downlink optical signals sent in through ports of the two trunk fibers to each port of the branch fiber, and optical signals sent in through each port of the branch fiber are super-positioned first and then output from ports of the trunk fibers;

said WDM device at unit side can respectively pass the downlink optical signals $D_A$ and $D_B$ that are transmitted by the branch fiber connected with it to the first interface circuit A' and second interface circuit B' of corresponding ONU P, and pass the unlink optical signals that are transmitted by the two interface circuits to said branch fiber.

2. The PON system in claim 1, characterized in that it also comprises several ONUs P' that include the first interface circuits A' and the second interface circuits B', the first interface circuit A' and the second interface circuit B' in the ONU are successively connected to said optical splitter network through a unit interface optical fiber, a WDM device at unit side and a branch fiber, wherein the WDM device at unit side that is connected with the first interface circuit A' can pass the downlink optical signal $D_A$ and the unlink optical signal $U_A$, but refuses the downlink optical signal $D_B$, while the WDM device at unit side that is connected with the second interface circuit B' can pass the downlink optical signal $D_B$ and the uplink optical signal $U_B$, but refuses the downlink optical signal $D_A$.

3. The PON system in claim 1, characterized in that it also comprises several ONUs P''' that include the first interface circuits A', the first interface circuit A' of the ONU P''' is successively connected to said optical splitter network through a unit interface optical fiber, a WDM device at unit side and a branch fiber, wherein the WDM device at unit side can pass the downlink optical signal $D_A$ and the uplink optical signal $U_A$, but refuses the downlink optical signal $D_B$.

4. The PON system in claim 1, wherein said optical splitter network is composed of an optical splitter of N:2.

5. The PON system in claim 1, wherein said optical splitter network is composed of two optical splitters of 2:1 and two optical splitters of N:2, and two outputs of each optical splitter of 2:1 are connected to inputs of the two optical splitters of N:2.

6. The PON system in claim 1, wherein topology of the PON system is tree topology, bus topology, ring topology or a combination thereof.

7. The PON system in claim 1, wherein the system is the PON system of WDM, in which wavelengths of the uplink signals $U_A$ that are transmitted by the first interface circuit A' in each ONU are different from each other, and wavelengths of the uplink signals $U_B$ that are transmitted by the second interface circuit B' are also different from each other, but a band in which uplink optical signal $U_A$ resides does not overlap a band in which uplink optical signal $U_B$ resides, the first WDM device can only pass signals of the band in which uplink optical signal $U_A$ resides in uplink direction, and the second WDM device can only pass signals of the band in which uplink optical signal $U_B$ resides in uplink direction.

8. A protection backup method of a PON system based on wavelength protection, comprising the following steps:
when in normal operation, in downlink direction, the interface circuits A and B of the OLT will respectively transmit downlink optical signals $D_A$ and $D_B$ with different wavelengths, these two optical signals will proceed for optical power distribution after being transmitted to the optical splitter network through individual trunk line, so that within each branch fiber there exists the downlink optical signals $D_A$ and $D_B$, then by utilizing the WDM device on branch line, only the optical signal $U_A$ in the branch fiber is passed to the interface circuit A of the ONU and only the optical signal $U_B$ is passed to the interface circuit B of the ONU;
in uplink direction, the interface circuits A and B of the OLT will respectively transmit uplink optical signals $U_A$ and $U_B$ with different wavelengths, these two optical signals will first be transmitted to the optical splitter network through the branch lines and then be transmitted to the two trunk lines, then by utilizing the WDM device on the trunk line, only the optical signal $U_A$ is passed to the interface circuit A of the OLT and only the optical signal $U_B$ is passed to the interface circuit B of the OLT;
as a result, two bidirectional optical paths are formed with one being active and the other being backup between the interface circuits A and between the interface circuits B of said OLT and said ONU, the two active/backup bidirectional optical paths independently perform registration, distance measurement and dynamic adjustment of bandwidth, and when the active bidirectional optical path is out of work, it will directly switch the service to the backup bidirectional optical path.

9. The protection backup method in claim 8, wherein said active/backup bidirectional optical paths are set in load sharing mode and transmit services at the same time in the active/backup optical paths.

10. The protection backup method in claim 8, wherein when the system is the PON system of WDM, the WDM device of the trunk line is set to pass signals of one band in uplink direction.

11. The protection backup method in claim 8, wherein said protection backup method has nothing to do with link layer technology of PON and it can be used in power PON such as APON, EPON and GPON, and the like.

12. The PON system in claim 2, wherein said optical splitter network is composed of an optical splitter of N:2.

13. The PON system in claim 3, wherein said optical splitter network is composed of an optical splitter of N:2.

14. The PON system in claim 2, wherein said optical splitter network is composed of two optical splitters of 2:1 and two splitters of N:2, and two outputs of each optical splitter of 2:1 are connected to inputs of the two optical splitters of N:2.

15. The PON system in claim 3, wherein said optical splitter network is composed of two optical splitters of 2:1 and two splitters of N:2, and two outputs of each optical splitter of 2:1 are connected to inputs of the two optical splitters of N:2.

16. The PON system in claim 2, wherein topology of the PON system is tree topology, bus topology, ring topology or a combination thereof.

17. The PON system in claim 3, wherein topology of the PON system is tree topology, bus topology, ring topology or a combination thereof.

18. The PON system in claim 2, wherein the system is the PON system of WDM, in which wavelengths of the uplink signals $U_A$ that are transmitted by the first interface circuit A' in each ONU are different, and wavelengths of the uplink signals $U_B$ that are transmitted by the second interface circuit B' are also different, but a band in which uplink optical signal: $U_A$ resides does not overlap a band in which uplink optical signal $U_B$ resides, the first WDM device in uplink direction can only pass signals of the band in which uplink optical signal $U_A$ resides, and the second WDM device in uplink direction can only pass signals of the band in which uplink optical signal $U_B$ resides.

19. The PON system in claim 3, wherein the system is the PON system of WDM, in which wavelengths of the uplink signals $U_A$ that are transmitted by the first interface circuit A' in each ONU are different, and wavelengths of the up link signals $U_B$ that are transmitted by the second interface circuit B' are also different, but a band in which uplink optical signal $U_A$ resides does not overlap a band in which uplink optical signal $U_B$ resides, the first WDM device in uplink direction can only pass signals of the band in which uplink optical signal $U_A$ resides, and the second WDM device in uplink direction can only pass through signals of the band in which uplink optical signal $U_B$ resides.

* * * * *

UNITED STATES PATENT AND TRADEMARK OFFICE
CERTIFICATE OF CORRECTION

PATENT NO. : 7,634,160 B2
APPLICATION NO. : 11/912973
DATED : December 15, 2009
INVENTOR(S) : Mingsheng Li et al.

Page 1 of 1

It is certified that error appears in the above-identified patent and that said Letters Patent is hereby corrected as shown below:

Column 6, line 38, "optical to the WDM devices C4, C1 and C7 connected" should read --optical to the WDM devices C4, C11 and C7 connected--

Column 6, line 42, "While the WDM device C1 filters out the $\lambda 1$ optical signal" should read --While the WDM device C11 filters out the $\lambda 1$ optical signal--

Column 9, line 37, "and a backup wavelength, wherein $\lambda w1$: n (expressing awl," should read --and a backup wavelength, wherein $\lambda w1$: n (expressing $\lambda w1$,--

Column 10, line 38, "optical signal $D_A$; the second interface circuit B' is used" should read --optical signal $D_A$; the second interface circuit B is used--

Signed and Sealed this

Fourth Day of May, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,634,160 B2 | Page 1 of 1 |
| APPLICATION NO. | : 11/912973 | |
| DATED | : December 15, 2009 | |
| INVENTOR(S) | : Mingsheng Li et al. | |

It is certified that error appears in the above-identified patent and that said Letters Patent is hereby corrected as shown below:

Column 6, line 38, "optical to the WDM devices C4, C1 and C7 connected" should read --optical to the WDM devices C4, <u>C11</u> and C7 connected--

Column 6, line 42, "While the WDM device C1 filters out the $\lambda 1$ optical signal" should read --While the WDM device <u>C11</u> filters out the $\lambda 1$ optical signal--

Column 9, line 37, "and a backup wavelength, wherein $\lambda w1$: n (expressing awl," should read --and a backup wavelength, wherein $\lambda w1$: n (expressing <u>$\lambda w1$</u>,--

Column 10, line 38, "optical signal $D_A$; the second interface circuit B' is used" should read --optical signal $D_A$; the second interface circuit <u>B</u> is used--

Column 11, line 5, "downlink optical signal $D_A$ and the unlink optical signal $U_A$," should read --downlink optical signal $D_A$ and the <u>uplink</u> optical signal $U_A$,--

Column 12, line 55, "in each ONU are different, and wavelengths of the up link" should read --in each ONU are different, and wavelengths of the <u>uplink</u>--

This certificate supersedes the Certificate of Correction issued May 4, 2010.

Signed and Sealed this

Thirteenth Day of July, 2010

David J. Kappos
*Director of the United States Patent and Trademark Office*